United States Patent [19]
Bjorge

[11] Patent Number: 5,469,922
[45] Date of Patent: Nov. 28, 1995

[54] SOIL AERATOR

[76] Inventor: Scott W. Bjorge, 404 Adams Ave., Owatonna, Minn. 55060

[21] Appl. No.: 110,215

[22] Filed: Aug. 23, 1993

[51] Int. Cl.$^6$ .................................................. A01B 45/02
[52] U.S. Cl. ............................... 172/22; 172/60; 172/92; 172/123; 172/125
[58] Field of Search .................... 172/21, 22, 47, 172/49, 57, 60, 74, 91, 92, 106, 118, 123, 125, 545, 546; 74/52; 403/2

[56] References Cited

U.S. PATENT DOCUMENTS

| | | | |
|---|---|---|---|
| 980,341 | 1/1911 | Roper | 403/2 |
| 1,444,530 | 1/1922 | Schrum | 172/60 X |
| 1,704,986 | 3/1929 | Marcy . | |
| 2,206,264 | 7/1940 | Rose | 97/44 |
| 2,580,236 | 12/1951 | Mascaro | 97/52 |
| 3,138,209 | 6/1964 | King | 172/125 X |
| 3,393,751 | 7/1968 | Mascaro | 172/21 |
| 3,643,746 | 2/1972 | Dedoes | 172/445 |
| 3,802,513 | 4/1974 | Ploenges | 172/21 |
| 3,805,627 | 4/1974 | Burton | 74/52 |
| 3,957,122 | 5/1976 | van der Lely | 172/60 |
| 4,084,642 | 4/1978 | Killion | 172/21 |
| 4,773,486 | 9/1988 | Huber | 172/22 |
| 5,029,652 | 7/1991 | Whitfield | 172/21 |
| 5,152,348 | 10/1992 | Flanagan et al. | 172/21 |
| 5,207,228 | 5/1993 | Hatlen | 172/22 |

Primary Examiner—Dennis L. Taylor
Assistant Examiner—Scencer Warnick
Attorney, Agent, or Firm—Jacobson & Johnson

[57] ABSTRACT

A soil aerator comprising a planetary aeration system, a frame, an attachment mechanism and a drive unit to form aeration holes the soil aerator having an attachment mechanism to allow it to be attached to a conventional farm tractor, a friction drive pulley system to permit slippage to protect the drive train if the soil aerator hits an obstruction, an adjustment mechanism to set different angles of penetration of the aeration tools into the ground to allow use of the soil aerator on different soils such as loam, clay, soft dirt and the like and a spring system to absorb impact energy as the soil aeration tools penetrate the soil.

15 Claims, 5 Drawing Sheets

SOIL AERATOR

FIELD OF THE INVENTION

This invention relates to the field of ground care, and more specifically, to the field of ground care equipment for aerating the soil by forming air pockets in the soil.

BACKGROUND OF THE INVENTION

One of the difficulties with soil aeration equipment is that the soil aeration equipment that can properly handle the different types of turf and different types of soil is generally bulky and costly.

The present invention provides an improved soil aerator apparatus which connects to a standard three-point hitch of a farm tractor and allows an operator to adjust the soil aerator for the type of soils as well as to adjust the spacing of the aeration holes.

DESCRIPTION OF THE PRIOR ART

U.S. Pat. No. 5,207,278 depicts a turf aerator which uses a walking motion to aerate the ground.

U.S. Pat. No. 5,152,348 illustrates a turf spiking machine which uses prongs to spike the ground and a plate to keep the ground in place once spikes are removed.

U.S. Pat. No. 3,393,751 shows a turf aerating machine where compressible sheaths surround the spiking device and compress upon contact with the ground.

U.S. Pat. No. 3,643,746 illustrates a wheel type mechanism having tubes attached to the outside of it to aerate the ground once the wheel begins moving.

U.S. Pat. No. 2,206,264 shows a push type machine where the motion of the machine drives a spike into and out of the ground using a wheel apparatus.

U.S. Pat. No. 3,802,513 illustrates a push type machine which uses a motor to push spikes attached to an axle into and out of the ground.

U.S. Pat. No. 4,084,642 depicts a turf perforating machine which removes plug from the aerated lawn.

U.S. Pat. No. 1,704,986 illustrates a spiked lawn roller which when pushed along a lawn encourages several spikes located around its main wheel center to aerate the ground.

U.S. Pat. No. 2,580,236 shows a turf aerator that aerates the ground by gouging, caused by the forward motion of the push machine.

U.S. Pat. No. 5,029,652 illustrates an aerating device which needs a mounting frame, this machine using a spiked wheel to aerate the ground.

BRIEF SUMMARY OF THE INVENTION

Briefly, the invention comprises a soil aerator having attachment members for connecting to a conventional farm tractor, a planetary aeration system for periodically extracting plugs of soil, an adjustment mechanism for controlling the angle of the entrance of the soil aeration tool and for absorbing the impact of the aeration tool on the soil, a drive train including a friction drive to protect the drive train and spring members to absorb the shock as the soil aeration tool periodically penetrates the soil.

DESCRIPTION OF THE PREFERRED EMBODIMENT

Figure 1:
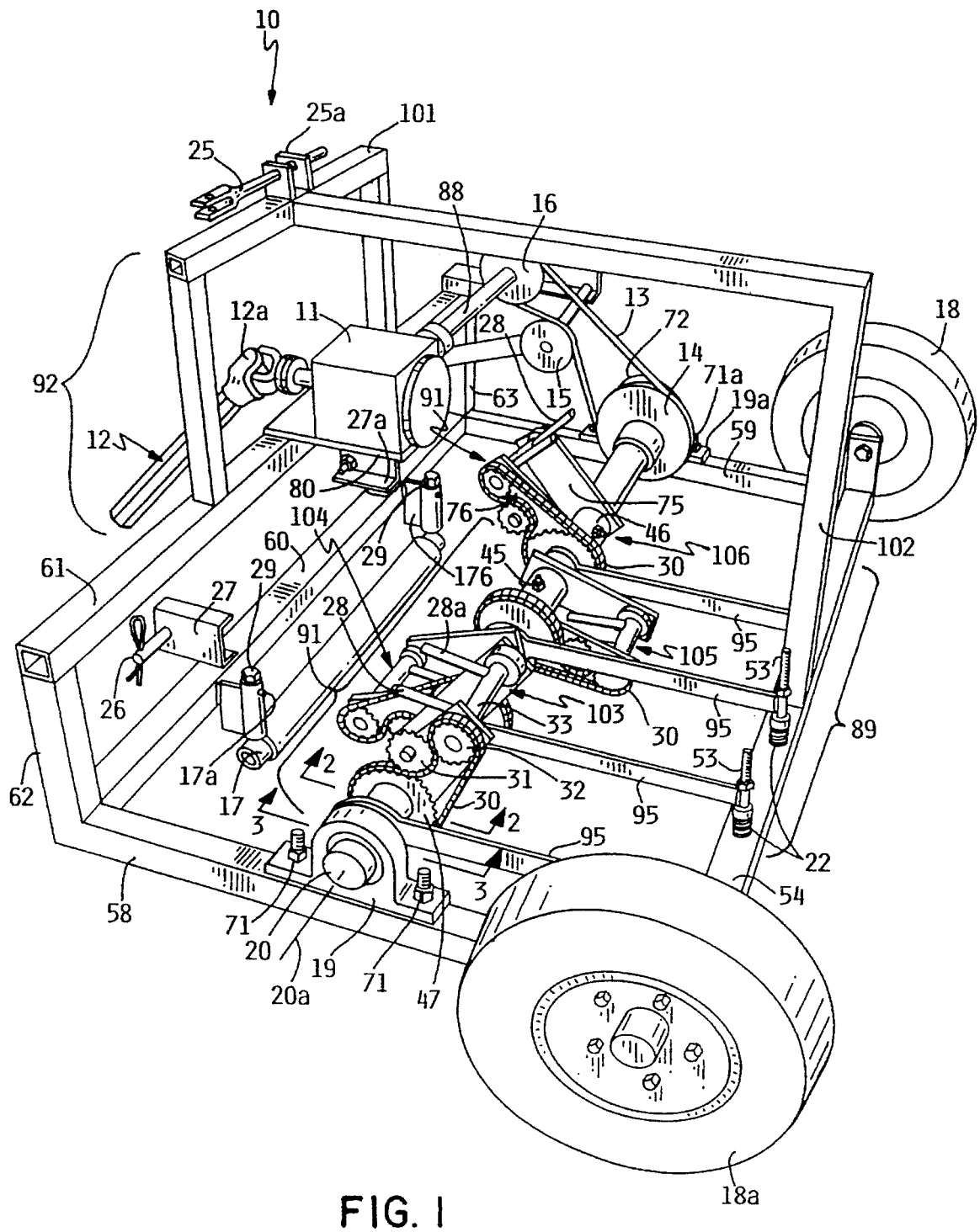
FIG. 1 is a perspective view of my soil aerator.

FIG. 1 shows my tractor-drawn soil aerator 10. The tractor-drawn soil aerator 10 includes a frame 89, a planetary aerating system 91 mounted on the frame 89, a drive mechanism 92 for powering the planetary aeration system 91 and a three point attachment system for connecting the aerator to a farm tractor or the like.

The tractor-drawn soil aerator is made mobile by a left wheel 18a and a fight wheel 18 connected to opposite sides of frame 89. Left wheel 18a is rotationally attached to a rear cross bar 54 at one end, and similarly, right wheel 18 is rotationally attached to the rear cross bar 54 at the other end. A roller 17 to support the front end of soil aerator 10 is supported by a front bar 60 through brackets 17a and 17b. Rotatable members 29 permit vertical adjustment of roller 17.

A cross bar 54 attaches at one end to a left beam 58, and similarly, at the other end to a right beam 59. Left beam 58 attaches to one end of front bar 60, and similarly, right beam 59 attaches to the other end of front bar 60.

Rear cross bar 54, left beam 58, right beam 59 and front bar 60 form a generally rectangular lower portion of frame 89. Extending at fight angles upward at front bar 60 is a left frame member 62 which is attached to one end of front bar 60, and similarly, extending upward is a right front member 63 which is attached to the other end of front bar 60.

Elevated front bar 61 then runs parallel to front bar 60, having one end attached to upper right member 63 and the other end attached to upper left member 62.

Frame 89 also includes a U-shaped member 101 having both ends connected to front bar 61. An L-shaped member 102 connects member 101 to cross member 54 to complete frame 89. Typically, frame 89 is made from box beams which are welded to one another to form a rigid and unitary frame construction.

Soil aerator 10 includes a power train for rotating planetary aeration system 91. The power train includes a power take-off drive shaft 12, a universal joint 12a, a right-angle drive 11, a shaft 88, a drive pulley 16, an idler pulley 15, a shaft pulley 14 and a flexible friction type drive belt 13. In operation of the soil aerator 10, rotation of power take-off drive member 12 rotates shaft 20. The use of a drive belt 13 in the power train provides a friction drive which through slippage over the pulleys 14 and 16 can absorb unexpected shocks on shaft 20. That is, even though the power take-off drive continues to rotate at a constant rpm, an impediment to rotation of shaft 20 can be absorbed by belt 13 slipping on pulleys 16 and 14. Thus the advantage of having a belt drive system in the power train is that if the tractor drawn soil aerator 10 should hit a rock or such while operating, belt 13 will slip, the cylindrical shaft 20 will stop rotating momentarily and the power train to the tractor drawn soil aerator 10 will suffer no damage. Typically, shaft 20 may be rotated at 250 rpm.

Attached to elevated front bar 61 is a plate 80 which supports a standard right-angle drive 11 which is located inside a protective covering to shield it from the elements.

Frame 89 connects to a conventional three-point tractor hitch through a fast bracket 27 and a pin 26, a second bracket 27a and a further pin (not shown) and a third bracket 25a and a pin 25. Use of a three-point hitch permits an operator to raise or lower the soil aerator 10 from the hydraulic controls on the tractor. The use of a universal joint in the drive train permits the operator to raise or lower the soil aerator while "on the go."

Extending across frame 89 is the planetary aeration system 91 which includes four sets of rotatable aeration members 103, 104, 105 and 106. Each of aeration members 103, 104, 105 and 106 is identical, so only one will be described herein. Although four aeration members are shown, more or fewer could be used in my soil aerator. In operation aeration members are spaced at equal angular positions about shaft 20 so as to both provide dynamic balance to the planetary aeration system 91 and limit the number of soil aeration tubes being driven into the soil at any one time. As the aeration members 103, 104, 105 and 106 rotate about axis 20a and drive soil aeration tubes 28 and 28a into and out of the soil the soil aeration tubes 28 and 28a each remove a plug of soil which during the top portion of the cycle of aeration members 103, 104, 105 and 106 is flung out of the soil aeration tubes by the centrifugal force acting on the plug of soil in each of the soil aeration tubes. While my soil aerator is shown with soil aeration tubes one could if desired use soil spikes for aerating the soil.

Figure 5:
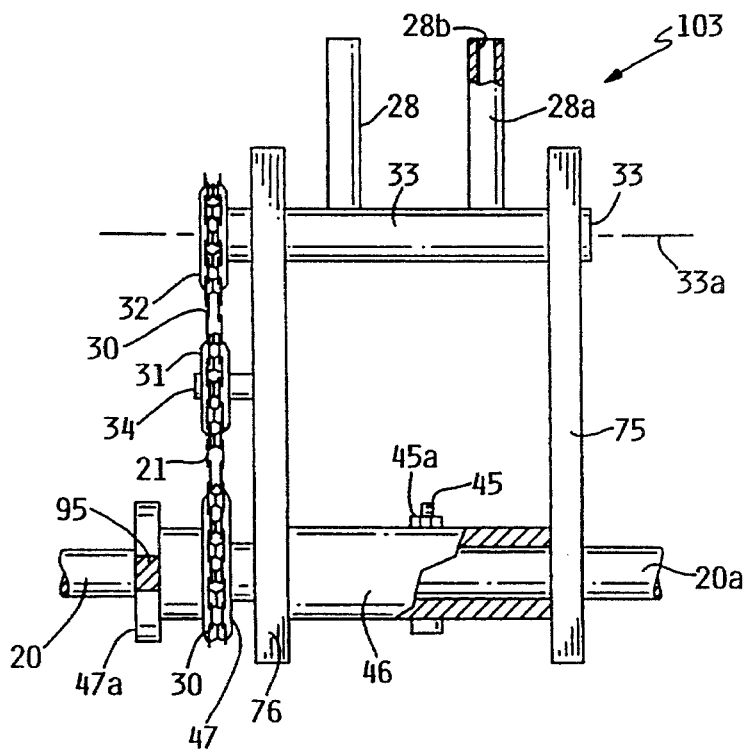
FIG. 5 is a rear view of aeration member.

FIG. 5 shows a rear-view of aerator member 103. Aerator member 103 includes a first crank arm 75 and a second crank arm 76 spaced from and located parallel to crank arm 75. One end of a tubular housing 46 fixedly connects to one end of crank arm 76, and the other end of cylindrical tubular housing 46 fixedly connects to one end of crank arm 75. A shear bolt 45 having nut 45a extends through housing 46 and through a hole, not shown, in shaft 20 so that rotation of shaft 20 rotates crank arms 75 and 76 about a central axis 20a. By having aeration member 103 connects to drive shaft 20 through shear bolt 45 permits shearing of the bolt rather than breaking shaft 20 in the event that the aeration member 103 is prevented from rotation by an object in the soil.

A rotatable shaft 33 extends through crank arm 75 and crank arm 76. Shaft 33 is axially restrained but journaled in crank arms 75 and 76 to permit free rotation therein. Shaft 33 rotates about a central axis 33a. Fixedly connected to rotatable shaft 33 is a first soil aeration tube 28 and a second soil aeration tube 28a. Soil aeration tube 28a is shown partially cut away revealing a central opening 28b. Located on one end of shaft 33 is a sprocket wheel 32, which has teeth 32t (see FIG. 3), for rotating shaft 33 within members 75 and 76. Extending outward from crank arm 76 is a stub shaft 34 having an idler sprocket wheel 31, which has teeth 31t, (see FIG. 3) rotatably mounted thereon. A sprocket wheel 47, which has teeth 47t, (see FIG. 3) fixedly attaches to a housing 47a which is journaled about shaft 20 to permit rotation of shaft 20 within housing 47a.

Figure 3:
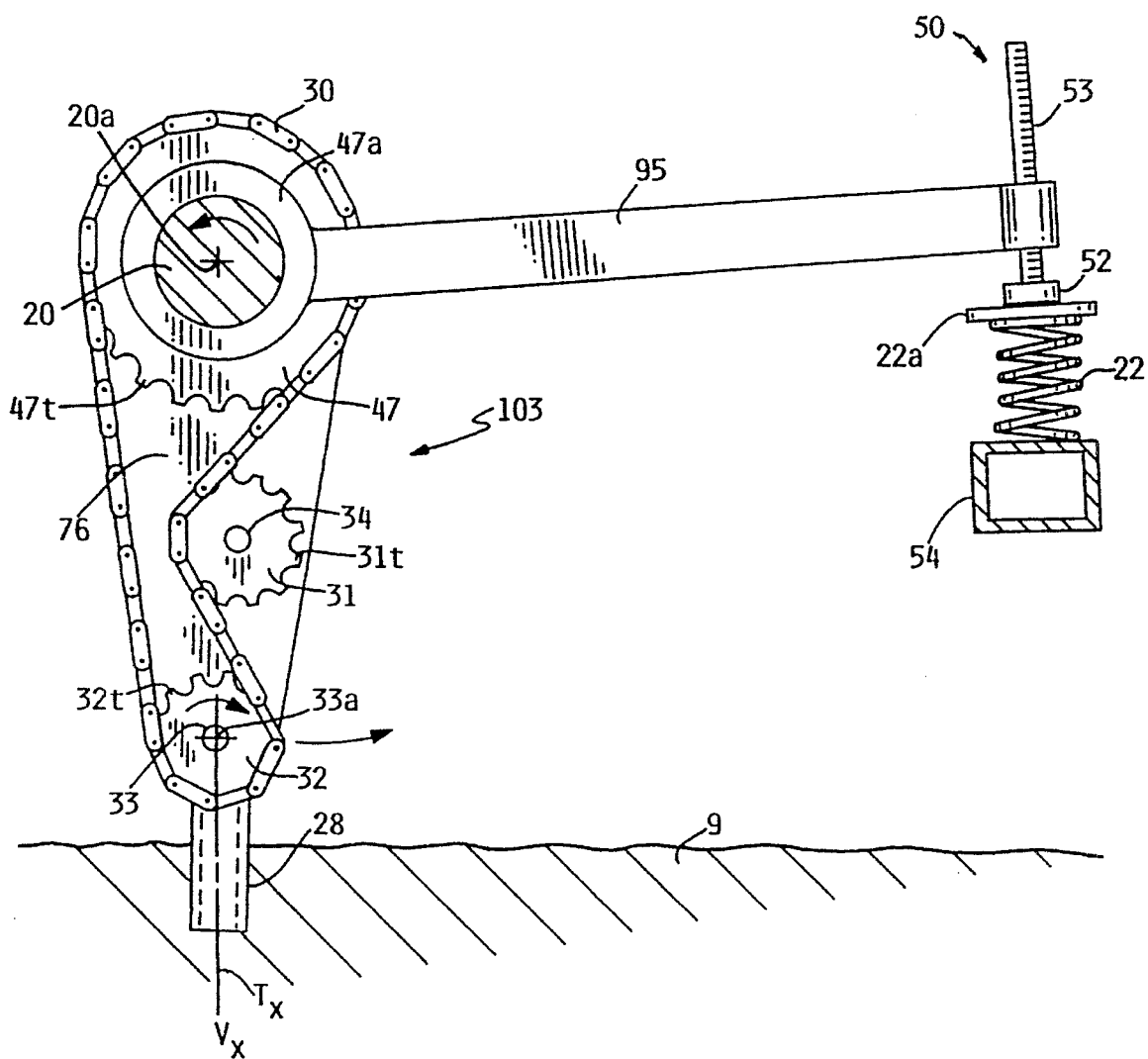
FIG. 3 is a partial side sectional view showing a soil-aeration member engaging the soil and a timing bar with an adjustment mechanism.

An endless sprocket chain 30 connects sprocket wheel 32, idler sprocket wheel 31 and sprocket wheel 47. To understand the operation of crank arms 75 and 76, refer to FIG. 3. FIG. 3 shows a partial side view showing arm 76 in a six-o'clock position.

The arrow in FIG. 3 indicates shaft 20 rotates in a counterclockwise direction while housing 47a, which is journaled around shaft 20, is prevented from rotation with respect to shaft 20 by a timing bar 95 which extends radially outward to engage cross-bar 54 through spring 22, a plate 22a, and a threaded adjustment member 53 having a head 52. Threaded adjustment member 53 is rotateable within a threaded recess (not shown) located in the end of timing bar 95.

In operation of planetary soft aeration member 103, shaft 20 drives crank arm 76 in a counterclockwise direction around shaft axis 20a. Sprocket chain 30 passes around sprocket wheel 47, which is prevented from rotating by timing bar 95, and around idler sprocket wheel 31 causing counterclockwise rotation of sprocket wheel 32 with respect to axis 33a.

Figure 2:
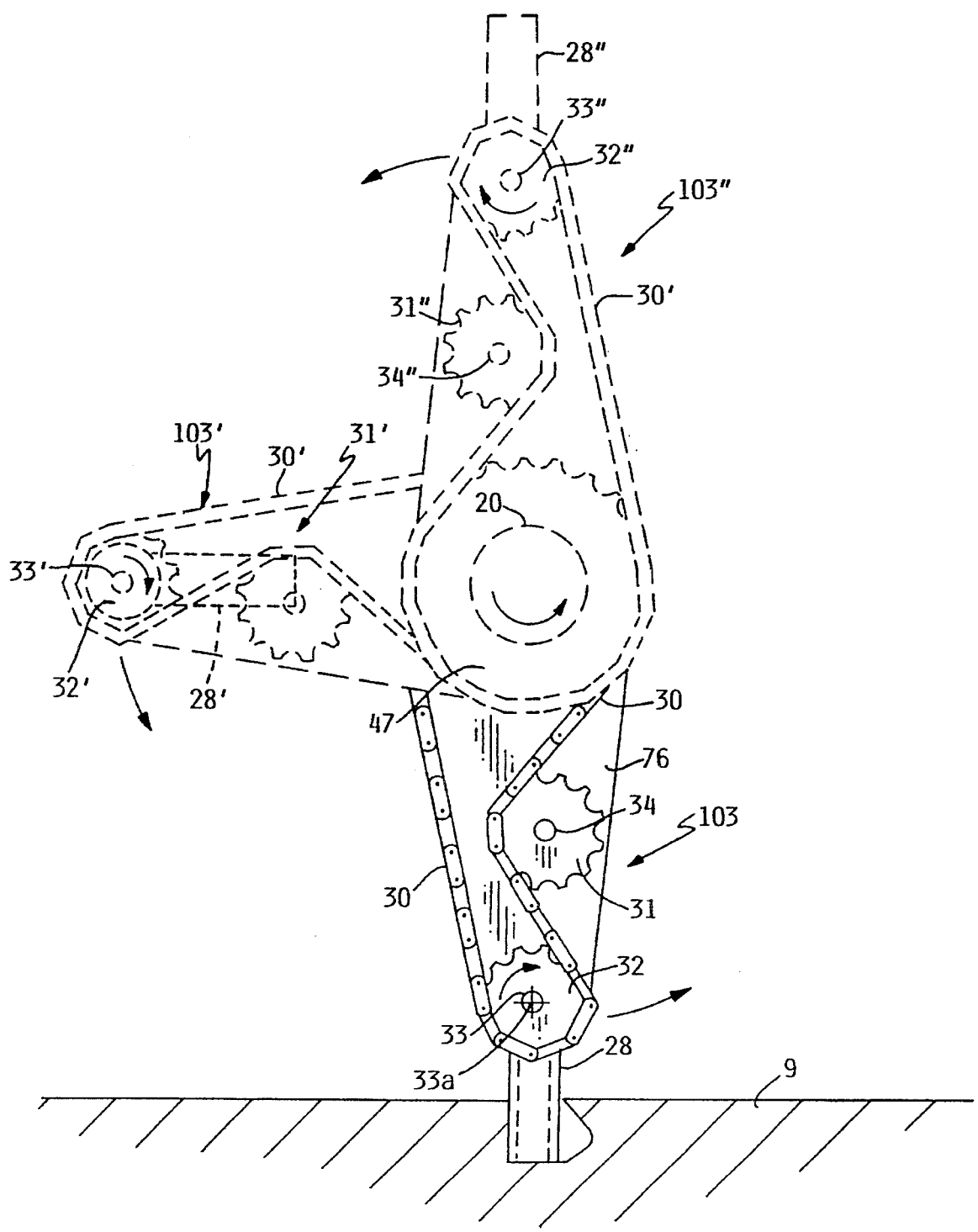
FIG. 2 is a partial schematic view illustrating the planetary motion of my a soil-aeration member.

FIG. 3 shows the central axis $T_x$ of soil aeration robe 28 in alignment with vertical axis $V_x$ To appreciate the relative rotation of the various aeration members with respect to each other and with respect the cycle, refer to FIG. 2 which shows crank arm 103 in three different positions during a revolution of aeration member 103. The solid lines show crank arm 103 in the six-o'clock position with dotted lines and prime markings indicating crank arm 103 in the nine-o'clock and dotted lines and double prime markings indicating crank arm 103 in the 12-o'clock positions. In the 12-o'clock position, tube 28 extends vertically upward, and as crank arm 76 rotates to the nine-o'clock position, tube 28 completes half a rotation and points directly inward toward shaft 20. As crank arm 76 continues its downward counterclockwise rotation, tube 28 rotates clockwise about axis 33a until it extends generally radially outward in a position to be driven into the soil as indicated by crank arm 103 which is located in the six-o'clock position.

In operation of the unit as shown in FIG. 3, aeration tube 28 enters substantially perpendicular to the ground. However, I provide an adjustment mechanism to vary the angle the soil aeration tube 28 enters and leaves the soil. This adjustment mechanism allows one to adjust the soil aeration tubes for the type of soil. For example, the angle of entrance for the soil aeration tube can be adjusted to accommodate clay soils as well as sandy soils or can be adjusted to accommodate the type of turf being aerated. Such adjustments can made by the operator based on trial and error. That is, since many factors including soil moisture effect the soil aeration process the operator has the advantage of being able to make "in the field" adjustments based on observation of the aeration holes being formed in the soil.

Figure 4:
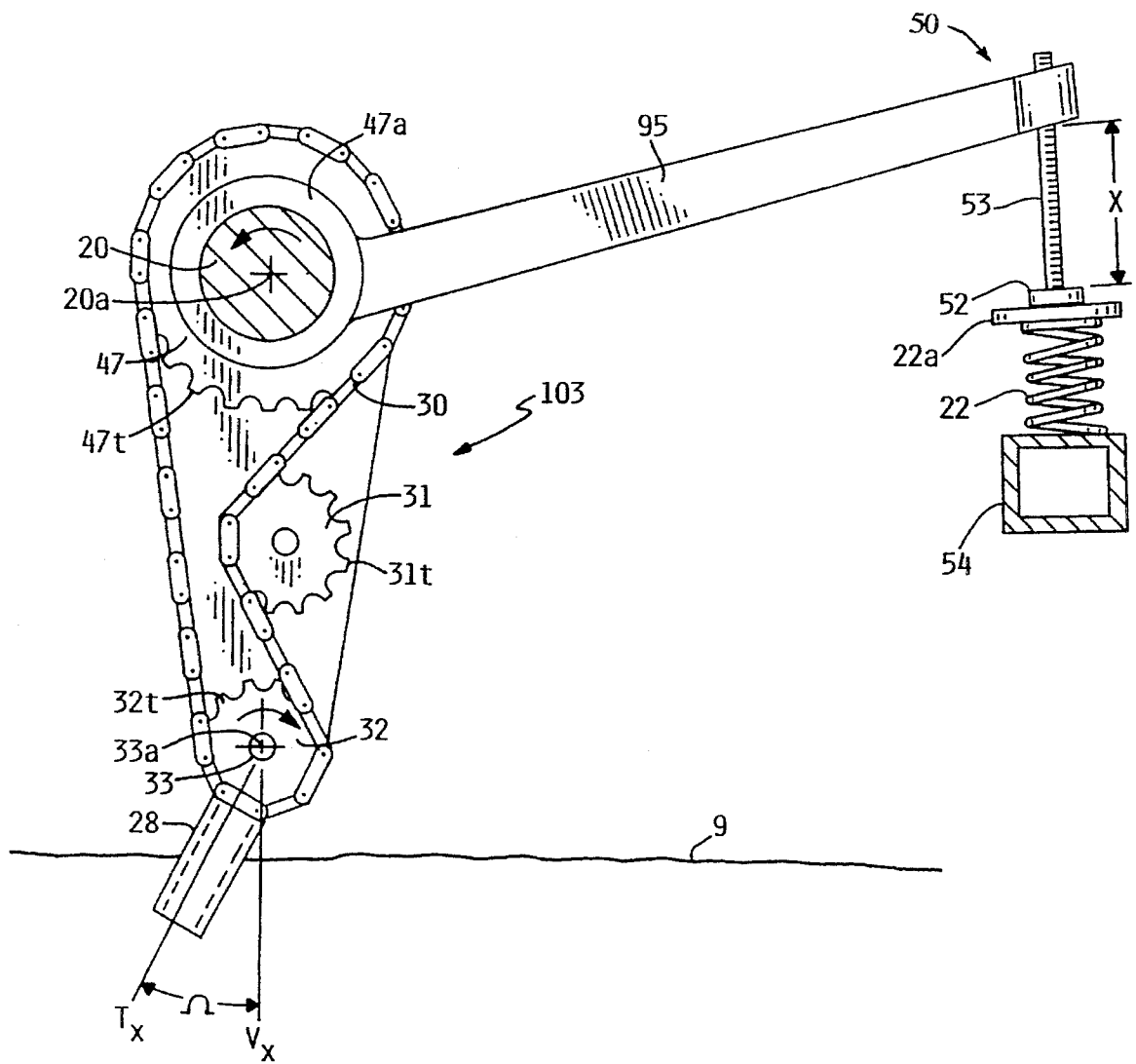
FIG. 4 is a side sectional view similar to FIG. 3 except the timing bar has been adjusted for a different penetration angle.

FIG. 4 shows how the adjustment mechanism 50 can alter the entrance angle $\Omega$ of soil aeration tube 28. Bolt 53 has been rotated within a threaded housing in timing bar 95. The extension of bolt 53 a distance x by rotation of bolt 53 (see FIG. 3) rotates arm 95 counterclockwise a few degrees about axis 20a and also rotates sprocket wheel 32 counterclockwise around axis 33a. The result is illustrated in FIG. 4 which shows that the axis $T_x$ of soil aeration tube 28 now enters the ground at an angle, Ω with respect to the vertical $V_x$ while FIG. 3 illustrates that without the adjustment the aeration tube 28 enters the soil substantially vertical. Thus a feature of the invention is the ability to change the angle the soil aeration tubes penetrate the soil thus enabling the operator to compensate for different soil conditions and types.

Adjustment mechanism 50 performs a dual function of adjusting the entrance angle of the soil aeration tube as well as absorbing shock to frame cross bar 54 by absorbing the impact of soil aeration tube 28 as it penetrates the soil. That is, the impact on soil aeration 28 is partially absorbed by chain 30 and spring 22. During rotation of crank arm 76 soil aeration tube 28 has no substantially resistance during the portion of the cycle that the soil aeration tube 28 is not in engagement with the soil. However, as soil aeration tube 28 is driven into the soil, the high impact forces on the soil aeration tube 28 can be transmitted through sprocket chain 30, wheel 47, arm 95, and member 53 to be partially absorbed by spring 22 thus minimizing vibration of the soil aerator. Thus the springs 22 absorb impact on the planetary aeration system to help eliminate vibration and damage to the aeration members while the friction drive belt 13 absorbs impacts to prevent damage to the drive train.

To understand the operation of soil aeration tube 28, refer to FIGS. 6–9 which illustrate in exaggerated fashion the motion of soil aeration tube 28 in conjunction with the motion of soil aerator 10.

Figure 6:
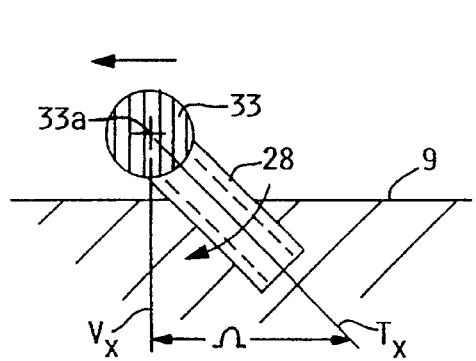
FIG. 6 is a partial schematic view of a soil aeration tube as it enters the soil.

FIG. 6 illustrates a position of the soil aeration tube 28 as it enters soil 9. The tractor drawn soil aerator 10 moves to the left as indicated by the arrow and shaft 33 is being driven in a counter clockwise motion by arm 76 (see FIG. 2) while soil aeration tube 28 rotates in a clockwise direction (indicated by curved arrow) about shaft 33 causing the soil aeration tube 28 to enter at an angle Ω with respect to the vertical axis $V_x$.

Figure 7:
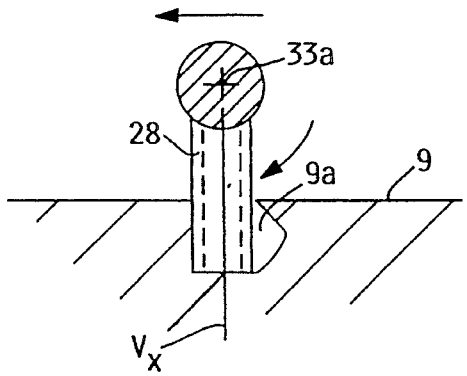
FIG. 7 is a partial schematic view of soil aeration tube showing the soil aeration tube of FIG. 6 as it proceeds through its cycle.

FIG. 7 shows a later position in the cycle. As the tractor continues to the left with the soil aerator, the soil aeration tube 28 continues it clockwise rotation about central axis 33a, and in doing so, captures a plug of the soil inside the soil aeration tube 28, but also forms a pocket 9a in soil 9 due to continued motion of the soil aerator and the rotation of soil aeratortor tube 28.

Figure 8:
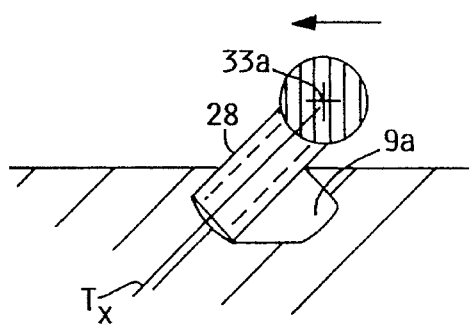
FIG. 8 is a partial schematic view showing the soil aeration tube of FIG. 6 about to be pulled out of the soil.

FIG. 8 illustrates a still later phase of the aeration process where soil aeration robe 28 continues its clockwise rotation as the tractor moves to the left resulting in the further enlargement of the hole in the soil.

Figure 9:
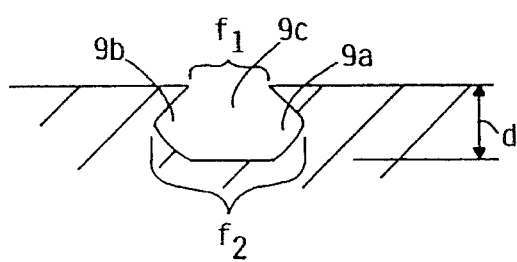
FIG. 9 shows a cross-sectional view of an aeration hole after penetration by the soil aeration tube.

FIG. 9 illustrates a general cross-sectional shape of the hole after removal of the soil aeration robe indicating a central region 9c where soil has been remove and enlarged bottom regions 9a and 9b having a dimension $f_2$ a where soil has been pushed to the side. The dimension "d" indicates the depth of the hole and typically may be adjusted from 1 to 6 inches by the operator.

Thus, with the present invention, the depth of penetration "d" can be varied by raising or lowering frame 10 through the hydraulic tractor system, and the angle and the shape of the hole forming the soil can be changed by adjusting the timing bar 95 to change the angle the soil aeration tube enters the soft.

FIG. 2 illustrates that in the present invention the shaft 33 makes two complete revolutions for each revolution of aeration member 76. The ratio of about two revolutions of the shaft with the soil aeration tubes for each revolution of the aeration members results in the soil aeration tubes being self cleaning. That is, the plug of soil captured in tubes 28 and 28a has been found to be thrown free of the soil aeration tube by the centrifugal force acting on the soil in robe 28. The forces can be appreciated by referring to FIG. 2 which shows tube 28" pointing vertically upward at the top of the cycle thus generating a large centrifugal force to fling the soil plug free of the aeration member.

I claim:

1. A soil aerator for pulling behind a vehicle comprising:

a frame;

a hitch connected to mid frame;

a drive shaft rotatably mounted on said frame;

drive means for rotating said drive shaft;

a plurality of aeration members located on said drive shaft, each of said plurality of members having a first end with a housing journaled around said drive shaft, each of said plurality of members having a second end having a further shaft rotatably mounted therein;

a first sprocket wheel mounted on said further shaft for rotating said further shaft;

a soil aeration tube mounted on said further shaft, said soil aeration tube rotatable with said further shaft;

a second sprocket wheel, said second sprocket wheel journaled around said drive shaft;

a timing bar connected to mid second sprocket wheel for setting an angle of entrance for the soil aeration tube, said timing bar restraining said second sprocket wheel from rotation thereabout by said frame;

a drive chain connected to said first sprocket wheel and said second sprocket wheel so that rotation of said member with said shaft causes the first sprocket wheel to rotate said aeration tube causing the aeration robe to periodically penetrate the soil.

2. The soil aerator of claim 1 including at least two soil aeration tubes on said further shaft.

3. The soil aerator of claim 1 wherein said drive means includes a friction drive belt to prevent damage to said drive shaft.

4. The soil aerator of claim 1 wherein each of said plurality of aeration members connects to said drive shaft through a shear bolt to permit shearing of the bolt rather than breaking the shaft in the event that the aeration members are prevented from rotation by an object in the soil.

5. The soil aerator of claim 1 including a friction drive in said drive means to absorb shock if the aeration member encounters an object.

6. The soil aerator of claim 1 including a timing bar for setting an angle of entrance for the soil aeration tube.

7. A soil aerator for pulling behind a vehicle comprising:

a frame;

a hitch connected to said frame;

a drive shaft rotatably mounted on said frame;

drive means for rotating said drive shaft;

a plurality of aeration member located on stud drive shalt, each of said plurality of members having a first end with a housing journaled around said drive shaft, each of said plurality of members having a second end having a further shaft rotatably mounted therein;

a first sprocket wheel mounted on said further shaft for rotating stud further shaft;

a soil aeration tube mounted on said further shaft, said soil aeration tube rotatable with said further shaft;

a second sprocket wheel, said second sprocket wheel journaled around said drive shaft and restrained from rotation thereabout said frame;

a timing bar for setting an angle of entrance for the soil aeration tube, a drive chain connected to said first sprocket wheel and mid second sprocket wheel so that rotation of said member with said shaft causes the first sprocket wheel to rotate said aeration tube causing the aeration tube to periodically penetrate the soil; and a spring mounted on said frame for resiliently supporting said timing bar to absorb impacts from the soil aeration tube as the soil aeration tube penetrates the soil.

8. The soil aerator of claim 1 including at least four aeration members angularly spaced for dynamic balancing of said drive shaft.

9. The soil aerator of claim 1 including a shear bolt securing one of said plurality of aeration member to said drive shaft.

10. The soil aerator of claim 1 including a three-point hitch for connecting to a farm tractor.

11. The soil aerator of claim 1 including an endless sprocket chain connecting said sprocket wheels to each other.

12. The soil aerator of claim 1 including adjustment members for adjusting an angle of entrance of the soil aeration tube.

13. A soil aerator comprising:

a frame;

a drive shaft rotatably mounted on said frame;

a plurality of aeration members located on said drive shaft, each of said plurality of aeration members having a first end carried by said drive shaft, each of said plurality of members having a second end having a further shaft rotatably mounted therein;

a first member mounted on said further shaft for rotating said further shaft;

a soil aeration tool mounted on said further shaft, said soil aeration tool rotatable with said further shaft;

a drive member, said drive member journaled around said drive shaft and restrained from rotation thereabout by said frame;

a timing mechanism, said timing mechanism angularly postionable to change an angle of entrance of the aeration tool, said drive member rotating said first member so that rotation of said drive shaft causes the drive member to rotate said aeration tool causing the aeration tool to periodically penetrate the soil as the soil aerator moves thereover.

14. A soil aerator comprising:

a frame;

a plurality of planetary soil aeration members carried by said frame, each of said plurality of aeration members having a first end rotatably carried by said frame, each of said plurality of members having a second end having a further shaft rotatably mounted therein;

a soil aeration tool mounted on said further shaft with said soil aeration tool having an end for penetration of a top layer of soil, said soil aeration tool rotatable with said further shaft;

a drive member, said drive member simultaneously rotating said plurality of planetary soil aeration members and said aeration tool while the soil aeration tube is in the soil to thereby cause the soil aeration tool to form an aeration pocket in the soil with the aeration pocket having a top opening smaller than a lateral dimension of the aeration pocket in the soil; and, a further member to absorb the impact of the aeration tool to help eliminate vibration to the frame.

15. The soil aerator of claim 14 wherein the drive member includes a friction drive belt.

* * * * *